Nov. 17, 1970   J. A. LUCCHINO   3,541,395
AVIATION RACK WITH COOLING DUCTS
Filed Nov. 15, 1968   2 Sheets-Sheet 1
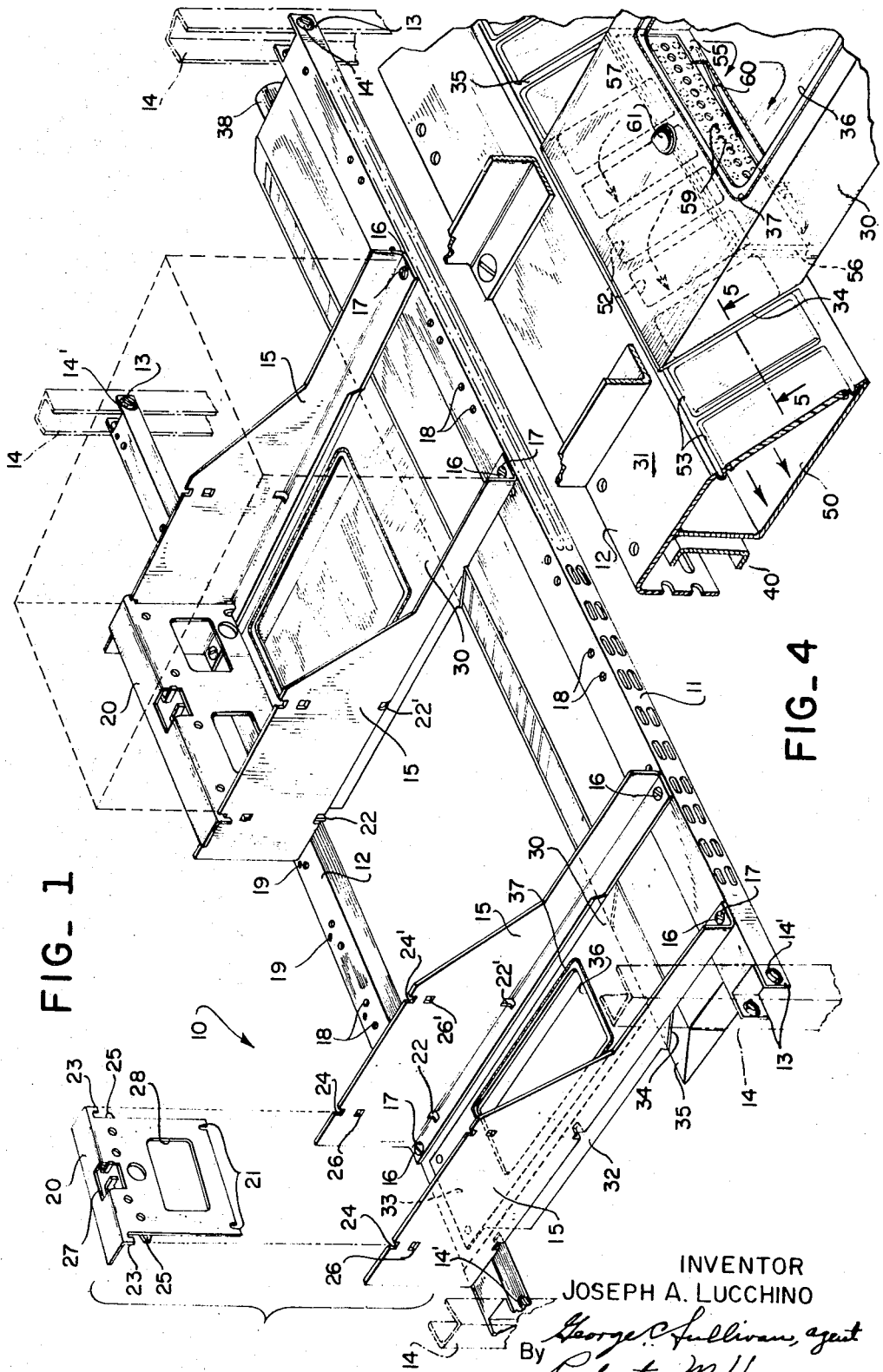
INVENTOR
JOSEPH A. LUCCHINO
By George C. Sullivan, agent
Robert M. Vargo
Attorney

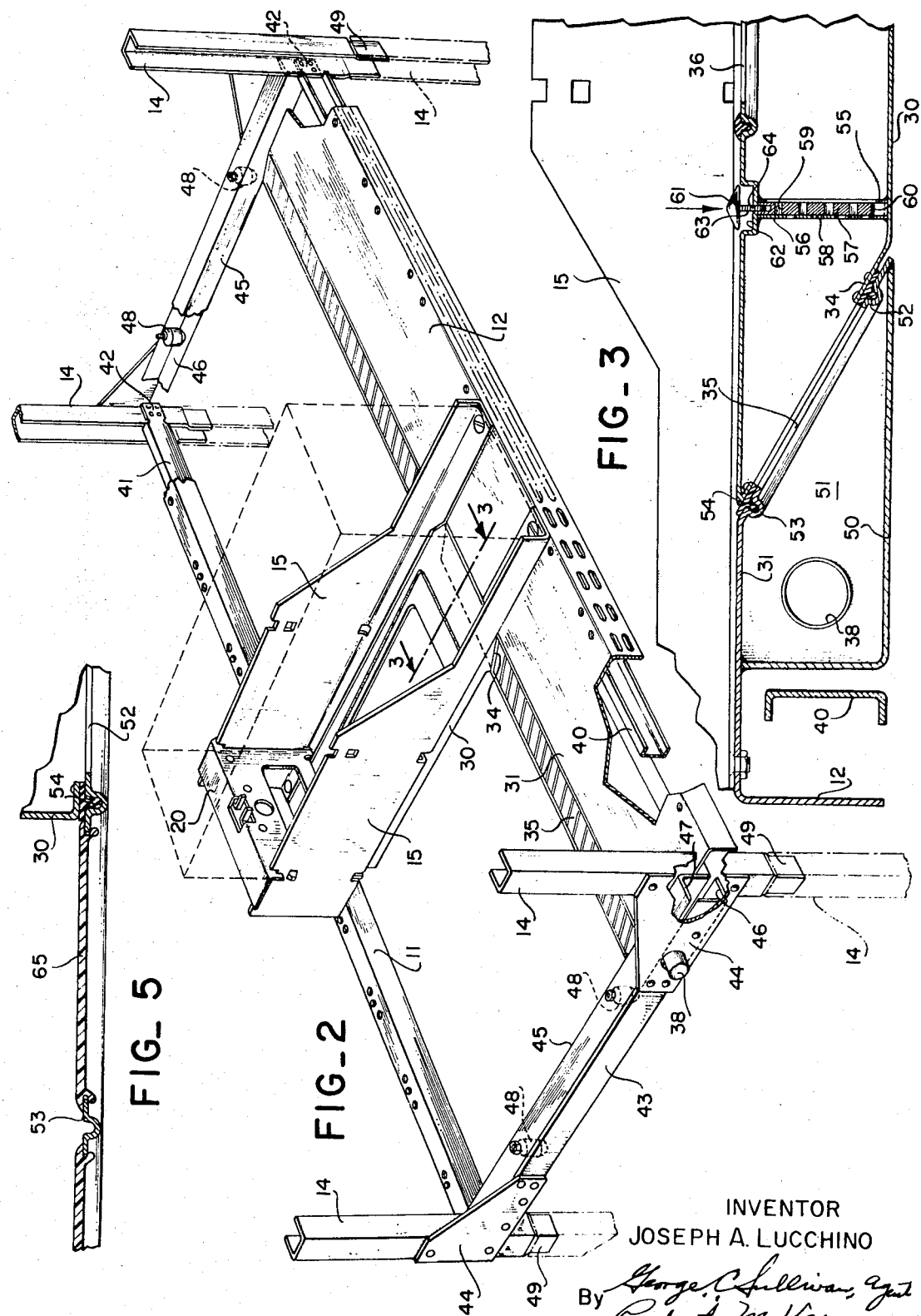

United States Patent Office 3,541,395
Patented Nov. 17, 1970

3,541,395
AVIATION RACK WITH COOLING DUCTS
Joseph A. Lucchino, Los Angeles, Calif., assignor to Lockheed Aircraft Corporation, Burbank, Calif.
Filed Nov. 15, 1968, Ser. No. 776,130
Int. Cl. H02b 1/04
U.S. Cl. 317—100
10 Claims

ABSTRACT OF THE DISCLOSURE

An aviation rack for supporting and cooling avionic equipment and which includes a pair of guide rails adapted to be adjustably attached to a pair of horizontal members for receiving avionic equipment of various physical dimensions. A cross duct is located between the guide rails in communication with central duct means for providing individual air cooling to the avionic equipment.

BACKGROUND OF THE INVENTION

Field of the invention

This invention relates to aviation racks for supporting avionic equipment and more particularly to adjustable support structure of the avionic equipment without requiring a corresponding hardware change in the support structure.

In the construction of all aircraft, a quantity of avionic equipment is required to fulfill the various operational modes of the aircraft. This various electronic equipment is utilized in aircraft communications, navigation, surveillance, controls and other modes which are necessary for the successful operation of the aircraft.

Description of the prior art

Heretofore it has been the practice to support equipment of this nature in racks of various sizes, each rack size accommodating only avionic units of standardized sizes. These units are rectangular in shape and are usually one of two standard lengths, commonly termed as a long and short model. They are also manufactured in various redundant widths standardized according to Air Transport Racking sizes, i.e., ¼ ATR, ⅜ ATR, ½ ATR, ¾ ATR and full ATR. Although these size standards have been applied for the convenience of the industry, such equipment is not necessarily limited to these dimensions.

Prior racks for supporting such equipment usually include a pair of parallel guide rails integrally connected at their ends to a pair of cross members, forming a rectangular base. An upright connector panel is located at the back end of the guide rails. An avionic unit, having a width equal to the span between the guide rails, is positioned onto the guide rails and is supported by the guide rails and the cross members. The back side of the unit includes receptacle means for receiving electrical plugs which extend through cutout portions of the connector panel. Each corner of the rectangular base is supported on a spring biased shock mount for shock absorption purposes. However, the rectangular base could be mounted directly on a solid shelf or the like.

When a new model of an airplane is being constructed the physical dimensions of much of the avionic equipment are not known at the time the aviation racks are being designed. One solution to this problem has been to stock a quantity of racks of various ATR sizes to allow for any contingency in the equipment design. However, this procedure has proven to be costly and inefficient. Another solution has been to wait until the final design of the avionic equipment is known before procuring its support equipment. This procedure has proven impractical because of the tight schedules followed by the aircraft manufacturers and the long lead time needed to procure such support equipment.

Even after airplanes are produced, the ever advancing technology of avionic equipment design often dictates size changes in such equipment. Changes in the physical characteristics of these units have usually accompanied such changes. With the advent of microminiaturization, these units have been diminishing in size. Of course, with each design change, it has been the practice to substitute a whole new support rack for the older, larger rack, with the older rack being discarded.

Furthermore, in commercial and military aircraft it is often necessary to vary the amount of avionic equipment utilized because of the change in conditions for different types of flights. A relatively short haul has different operational requirements than a transcontinental or a transoceanic flight. Therefore, if changes in avionic equipment are required, it is the practice to change the support structure also. If a number of these units are removed because they are not required for the flight, the support structure usually remains installed because of the cumbersome procedure in removing these racks. This, of course, adds dead weight to the aircraft, a highly undesirable result.

Problems also have arisen in the maintenance of prior art racks for avionic equipment. Besides being cumbersome to install on a shelf, the back connector panels of such racks, for example, have been particularly difficult to connect to the support bases. This has resulted from the requirement that a tool be used to loosen the fastening means of the panel, and since the panel was located at the rear of the shelf, often between other installation, it was difficult to acquire sufficient working space to manipulate the tool effectively.

Aside from the noted maintenance problems, there exists with respect to most avionic equipment a requirement for a specified amount of cooling be applied to each avionic unit. Furthermore, some of the equipment, particularly those components utilizing large numbers of vacuum tubes, require more cooling than others.

Various means and methods are commonly used in attempting to cool this equipment. The most common method is to cool the entire compartment in which the equipment is located. Another method is to enclose the shelves into a smaller compartment, usually by mounting cabinet sidewalls and doors onto the uprights supporting the shelves. Ducting is extended into that compartment to either blow cooling air into or suck heated air from the compartment, drawing cooling air from the room through louvres appropriately provided in the sidewall.

However, the described equipment and other approaches have proved inefficient in satisfactorily accommodating acceptance of electronic and electrical components and in preventing overheating. A large number of units naturally require a larger volume of cooling than such prior art approaches has been able to supply.

SUMMARY OF THE INVENTION

This invention overcomes in large measure those difficulties encountered in the prior means and methods for supporting and cooling avionic equipment. The invention provides for an aviation rack which includes a pair of parallel guide rails for supporting each avionic unit. Each pair of guide rails is adapted to be adjustably attached to a pair of lateral members. A connector panel is secured to each pair of guide rails by attachment means which can be readily manipulated by hand. Each connector panel has a cutout portion for receiving electrical transmission means connected to the supported unit. A cross duct is located between each pair of guide rails in a manner to communicate with a lateral duct for providing individual air cooling to each unit.

Thus, the invention fulfills a primary object by providing an avionic equipment rack which may be adjustably installed to support a plurality of avionic units of different sizes and in a variety of positions.

Another object of the invention is to provide an aviation rack which is lightweight, economical to manufacture, and easy to install and maintain.

A further object of the invention is to provide cooling means which individually ventilates each unit supported upon the racks.

Still another object of the invention is to provide an aviation rack that may be completely assembled prior to installation onto the shelf.

Another object of the invention is to provide means for shock mounting the entire support rack thereby eliminating the need for shock mounting each individual black box.

Yet another object of the invention is to provide an aviation rack for supporting a plurality of black boxes of different standard widths and lengths.

BRIEF DESCRIPTION OF THE DRAWINGS

FIG. 1 is a perspective view of an aviation rack in accordance with the present invention;

FIG. 2 is a perspective view of a second embodiment of the aviation rack;

FIG. 3 is a sectional view of the lateral and cross ducts taken along lines 3—3 of FIG. 2;

FIG. 4 is a perspective view partly in section of the lateral and cross ducts taken along lines 4—4 of FIG. 3; and FIG. 5 is a sectional view of the pull-out windows taken along lines 5—5 of FIG. 4.

DESCRIPTION OF THE PREFERRED EMBODIMENTS

Referring now to FIG. 1, the aviation rack system, generally indicated by arrow 10, includes a front lateral support member 11 and a rear lateral support member 12. Each support member has a pair of extensions 13 located at its ends for engagement to a pair of upright posts 14, shown in phantom lines. The engagement means are the conventional screw and nut means with the bores of the extensions being slightly oversized to also receive a rubber bushing 14' to provide for resilient mounting.

A plurality of guide rails 15 are adapted to be attached to the front and rear lateral support members 11 and 12. The guide rails 15 are arranged in pairs, each pair having a right and a left guide rail for receiving a unit of avionic equipment, also shown in broken lines. Each guide rail 15 is adapted to be attached to the lateral support members 11 and 12 by screws 16 which extend through the bores 17 of the guide rails 15 and the bores 18 located along the surface of each support member 11 and 12. The span between each pair of guide rails 15 is, therefore, adjustable because of the plurality of locations available for attachment. Two pairs of guide rails are illustrated: one for receiving a narrow unit; the other for receiving a relatively wider unit. Although the number of bores 17 could be such that an infinite number of widths could be obtained, the illustrated embodiment limits the spacing of the bores 18 to intervals coinciding to the smallest standard ATR size. Besides being adjustable as to span, each pair of guide rails is adjustable as to its fixed location, and the spacing of each pair is left to the discretion of the assembler. The rear lateral member 12 also has a plurality of projections 19 on its upper surface to act as indexing means, to ensure that the guide rails 15 are positioned properly. This is possible because the bores 17 of each guide rail 15 are located nearer the outside edge of the guide rail 15. Therefore, if a screw 16 were attempted to be inserted into the wrong bore 18 for attaching a guide rail 15, the projection 19 would interfere with the inner edge of the guide rail 15 and prevent the guide rail 15 from laying flush with the surface of the rear lateral support member 12.

A connector panel 20 is adapted to be removably attached to each pair of guide rails 15 to act as a holddown for the avionic unit. As shown, the connector panels 20 can be fabricated in various widths corresponding to the width of the particular unit inserted between the guide rails 15. For convenience, the standard ATR widths are preferred.

Although the connector panels 20 are of various widths, their attachment means are identical. The attachment means for each panel 20 comprises: (1) a pair of tabs 21 extending out of the lower corners thereof for insertion into a slot 22 located on the bottom surface of each guide rail 15; (2) a pair of projections 23 extending downwardly from the top corners thereof for insertion onto a notch 24 located on the upper edge of each guide rail 15; and (3) a pair of spring biased tongues 25 which are adapted to be inserted into an aperture 26 located on each guide rail 15 directly below the notch 24. The other end of each tongue 25 is bent to extend through an opening 27. Therefore, in attaching the connector panel 20 to the guide rails 15, the bent ends of the tongues 25 are squeezed together, by hand or tool, until the tongues 25 are positioned within the side edges of the panel 20. This permits the connector panel 20 to be inserted without interference by the tongues 25. The panel 20 is then placed into position with the tabs 21 and projections 23 being inserted into the respective slots 22 and notches 24. The tongues 25 are then released with spring means mounted on the back side of the connector panel 20 (not shown) moving the tongues 25 into the apertures 26 for securing the connector panel 20 into a locked position. Although the connector panels 20 are shown inserted near the rear of the guide rails 15 to accommodate the standard "long" units, these panels 20 may also be inserted in identical receiving means 22', 24', and 26' to accommodate the standard "short" units.

Each connector panel 20 also includes cutout portions 28 for receiving the airplane's receptacle installation which mates with the avionic unit's plug means located at the rear of the unit. The panel 20 also has provisions (not shown) for indexing pins, and rear holddown pins to secure the unit to the guide rails 15.

As can be seen, the avionic rack assemblies can be mounted in a variety of positions and can be adapted to receive avionic units of any size. Even the location of each pair of guide rails 15 is completely dependent on the choice of the operator. Thus, the same guide rails are used for any size of unit, thereby requiring only one type of guide rails to be stocked for use. Furthermore, since the connector panels 20 can be manufactured economically, it is a convenient matter to stock panels of various sizes.

It should also be noted that the connector panels 20 can be attached conveniently and easily by the operator without the use of any tools. This is particularly advantageous when lack of space behind the racks dictates that the disassembly must be conducted from in front of the racks.

The cooling means for each individual avionic unit is provided by cross ducts 30, each being in communication with a lateral duct 31, which extends the entire length of the shelf. Each cross duct consists of a plenum chamber 32 having a flanged end 33 which is connected to the rear support member 12. The front end of the plenum chamber 32 includes a beveled face 34 adapted to register flush with a beveled surface 35 of the lateral duct 31.

Like the connector panels 20, the cross ducts 30 extend the entire span between each pair of guide rails 15 and are fabricated in various widths. The top of each cross duct 30 includes an aperture 36 that provides the interior of the cross duct 30 with communication to the area directly beneath the avionic unit. Seal means 37 are located around each aperture 36 for sealing purposes.

The lateral duct 31 is located adjacent the support member 11 the entire length thereof. One end of the lateral duct 31 includes a nipple 38 adapted for connection to a central duct (not shown) for communication to a central source of negative or positive air supply. Other features of the lateral duct 31 will be described further hereinafter.

FIG. 2 shows a modification of the mounting means employed for supporting the entire shelf. The previous embodiment has the lateral support members 11 and 12 attached directly to the uprights 14. The resiliency in the mounting is provided by the bushings 14'. The second embodiment provides for another method of shock mounting the entire shelf.

This embodiment includes front and rear C-shaped bars 40 and 41 having flanged ends 42 for connection to the upright posts 14. A first pair of L-shaped cross members 43 is located between the opposite pairs of upright posts 14 and are connected thereto by means of gussets 44.

The lateral support members 11 and 12 are integrally connected at their ends to a second pair of L-shaped members 45 inverted to form a parallelogram with the first pair 43. As such, the rectangular structure is positioned between the upright posts 14 so that the support members 11 and 12 extend over the front and rear bars 40 and 41 and the second cross members 45 extend over first cross members 43. In this position, the upper surface 46 of the bottom leg of each member 43 faces the lower surface 47 of the upper leg of each member 45. A pair of spring biased shock absorbing means 48 are mounted on each surface 46 and are attached to each of the surfaces 47 to resiliently support the members 45 and the lateral members 11 and 12 as an integral unit. It is noted that the lateral members 11 and 12 are supported only by the shock mounts 48 through the members 45, and that the members 11 and 12 are not supported by the front and rear bars 40 and 41 (note the clearance more clearly shown in FIG. 3) nor are they directly attached to the uprights 14 in any manner. This support means thus enables the shelf to be free floating and resiliently mounted. The main advantages of supporting the shelf in this manner are: (1) the whole shelf is shock mounted by only four shock absorbers instead of following the prior practice of rigidly supporting the shelf and providing four shock mounts for each individual unit, thereby saving costs and weight in the total design; and (2) the entire shelf and racks may be completely assembled prior to placing the shelf onto the uprights, which makes the shelf easier to install and maintain.

The upright posts 14 can be made of single elongated pieces or they can be made into shorter sections as illustrated in FIG. 2. These sections 14 include tapered ends 49 which telescope into adjacent lower post 14.

The guide rails 15, connector plate 20 and cross duct 30 are identical to those shown in FIG. 1 with the description of the cross ducts 30 and lateral duct 31 being more fully described with regard to FIGS. 3 to 5.

FIGS. 3 and 4 show the support member 12 and the top portion of the lateral duct 31 being of a one-piece construction. An L-shaped member 50 is integrally attached along its ends to the top portion of the lateral duct 31 to form a lateral conduit. A wall 51 is located at each end of the lateral conduit with an orifice located at the one end for receiving the nipple 38. The beveled face 35 of the lateral duct 31 includes a plurality of ports 52. A groove 53 is formed around each port 52. The end 34 of each cross duct 30 is substantially open ended with an annular seal 54 located on the border of the opening. As the cross duct 30 is positioned between the guide rails 15, its face 34 lies flush with the face 35 of the lateral duct 31 and the annular seal 54 fits into the groove 53 to provide an airtight seal therebetween.

The cross duct 30 is further provided with a pair of wall sections 55 and 56 having a valve plate 57 reciprocally movable therebetween. The wall section 55 is substantially open while the wall section 56 is provided with a plurality of small apertures 58 formed therethrough. The valve plate 57 also has a plurality of slightly larger holes 59 defined therein. A leaf spring 60 is located between the wall sections 55 and 56 and beneath the valve plate 57. A button 61 is located within a well 62 formed on the cross duct 30 and is threadedly connected by a stem 63 to the valve plate 57 through a small hole 64 located at the bottom of the well 62.

In operation, when the cross duct 30 is placed into position between the guide rails 15, the valve plate 57 is normally closed. This is because the leaf spring 60 maintains the valve plate 57 in an upward position with the holes 59 being out of register with the apertures 58. As an avionic unit is placed on the rack, its bottom surface pushes the button 61 downward, as indicated by the arrow, thereby maintaining the apertures 58 and holes 59 in registry. As shown in FIG. 4, a suction is created by the central venting system, and the air located beneath the avionic unit is drawn in through the aperture 36, the valve plate 57 and the wall section 56, the ports 52 and into the lateral duct 31. From there the air moves through the nipple 38 to the central ventilating system.

It is also noted that the button 61 is adjustably threaded into the valve plate 57, the amount of which thus determines the amount of registry between the apertures 58 and the holes 59. Therefore, the valve plate 57 not only opens and shuts off the air supply, but it controls the volume of air flowing therethrough.

Finally, FIGS. 4 and 5 show a plurality of plastic windows 65 that are adapted to be inserted over those ports 52 that are not in register with a cross duct 30. Furthermore, if it were desired to draw off the air above the avionic units located on a shelf immediately below the one the lateral duct 31 is servicing, a portion or all of the cross ducts 30 and the windows 65 may be removed to effectuate cooling for both shelves.

As can be seen, the aviation rack, in accordance with the present invention, provides means for supporting a variety of avionic units in a variety of positions by using a large number of common, interchangeable parts. Such an aviation rack also provides individual and varied cooling to each unit as required.

I claim:
1. An aviation rack for supporting avionic equipment equipment comprising:
   a pair of lateral support members, each member having a plurality of means located longitudinally thereon for receiving attachment means;
   a pair of parallel guide rails having attachment means for connection to each of said lateral support members, said guide rails being adjustably positioned on said support members to vary the span between the guide rails for receiving units of avionic equipment of various widths, notch means located on each of said guide rails;
   a connector panel located between said guide rails and detachably connected thereto by projection means located on each side of said connector panel for insertion within said notch means on said guide rails, and means for securing said projection means within said notch means; and
   said connector panel having a cutout portion for receiving electrical means and holddown means that are adapted for connection to the unit of avionic equipment.

2. The invention in accordance with claim 1 wherein said means for securing said projection means within said notch means includes:
   an aperture defined on each guide rail; and
   spring biased tongue means extending out of both sides of the connector panel and adapted to be inserted into the apertures of said guide rails.

3. The invention in accordance with claim 2 wherein said guide rail means includes a plurality of notch means and apertures located on each guide rail to provide a plurality of positions thereon for receiving the connector panel.

4. The invention in accordance with claim 1 wherein each of said lateral support members is attached at its ends to a pair of upright posts.

5. The invention in accordance with claim 1 wherein each pair of ends of the lateral support members is connected to a cross member.

6. The invention in accordance with claim 5 wherein a pair of upright posts is provided adjacent the ends of said lateral support members and said cross members, another pair of cross support members being provided, each being rigidly attached at its ends to said upright posts to support said first mentioned cross members and other structure attached thereto.

7. An aviation rack for supporting avionic equipment comprising:
   a pair of lateral support members, each member having a plurality of means located longitudinally thereon for receiving attachment means;
   a pair of parallel guide rails having attachment means for connection to each of said lateral support members, said guide rails being adjustably positioned on said support members to vary the span between the guide rails for receiving units of avionic equipment of various widths;
   a connection panel located between said guide rails and detachably connected thereto, said connector panel having a cutout portion for receiving electrical means and holddown means that are adapted for connection to the unit of avionic equipment;
   a pair of cross members, the respective ends of said lateral support members being attached thereto;
   a pair of upright posts adjacent and attached to the ends of said lateral support members and said cross members;
   another pair of cross members rigidly attached at their ends to said upright posts to support said first-mentioned cross members and other structure attached thereto; and
   a pair of spring biased shock mounts located between said first and second-mentioned cross members for biasingly supporting the entire assembly supported by said first-mentioned cross members.

8. An aviation rack for supporting avionic equipment comprising:
   a pair of lateral support members, each member having a plurality of means located longitudinally thereon for receiving attachment means;
   a pair of parallel guide rails having attachment means for connection to each of said lateral support members, said guide rails being adustably positioned on said support members to vary the span between the guide rails for receiving units of avionic equipment of various widths;
   a connector panel located between said guide rails and detachably connected thereto, said connector panel having a cutout portion for receiving electrical means and holddown means that are adapted for connection to the unit of avionic equipment;
   air cooling means for ventilating the avionic unit, the air cooling means including a lateral duct contiguous to one of said lateral support members and extending substantially the entire length thereof, said lateral duct having means for providing communication of the same to the region between the pair of guide rails;
      a plurality of windows extending along the entire length of the lateral duct, and
      means for removably covering each window;
   a cross duct adapted to be positioned between the pair of guide rails and including,
      means for providing communication between said cross duct and said lateral duct,
      a top surface having an aperture for providing the cross duct with communication with the area above the cross duct;
   a valve means for varying the amount of air traveling through said cross duct, said valve means comprising,
      an apertured wall section extending across the interior of said cross duct,
      a gate located adjacent said wall section, said gate being reciprocable within said cross duct and having a plurality of orifices adapted to register in a first position with the apertures of said wall section, and
      means for moving said gate between said first position to a second position which places the orifices of said gate out of registry with the apertures of said wall section.

9. The invention in accordance with claim 8 wherein said means for moving said gate includes:
   a spring means located at the bottom of said gate for biasing said gate in its normally closed second position;
   a button having a stem threadedly connected to the upper portion of said gate, said button located adjacent the top surface of said cross duct for engagement with the bottom surface of the avionic unit whereby the placing of an avionic unit onto the guide rails pushes the button downward to move the gate to its open first position.

10. The invention in accordance with claim 9 wherein the stem of said button is adjustably threaded to the upper portion of said gate to limit the travel of said gate and vary the registry of the orifices of said gate with the apertures of said wall section.

References Cited

UNITED STATES PATENTS 3,192,306 6/1965 Skonnord _____ 317—100 X

FOREIGN PATENTS 1,204,300 11/1965 Germany.
1,453,283 9/1966 France.

LEWIS H. MYERS, Primary Examiner.

G. P. TOLIN, Assistant Examiner.